Patented Jan. 26, 1943

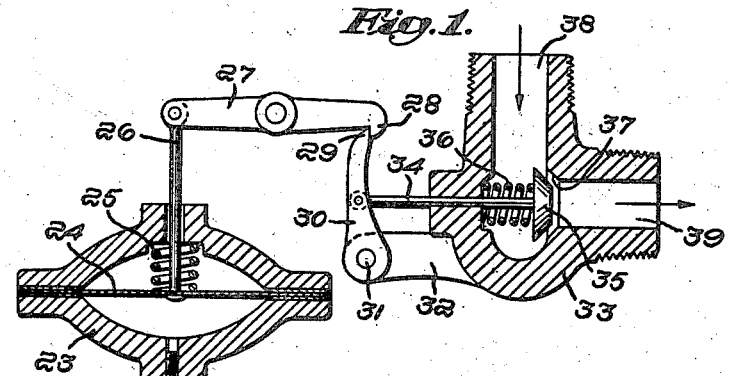
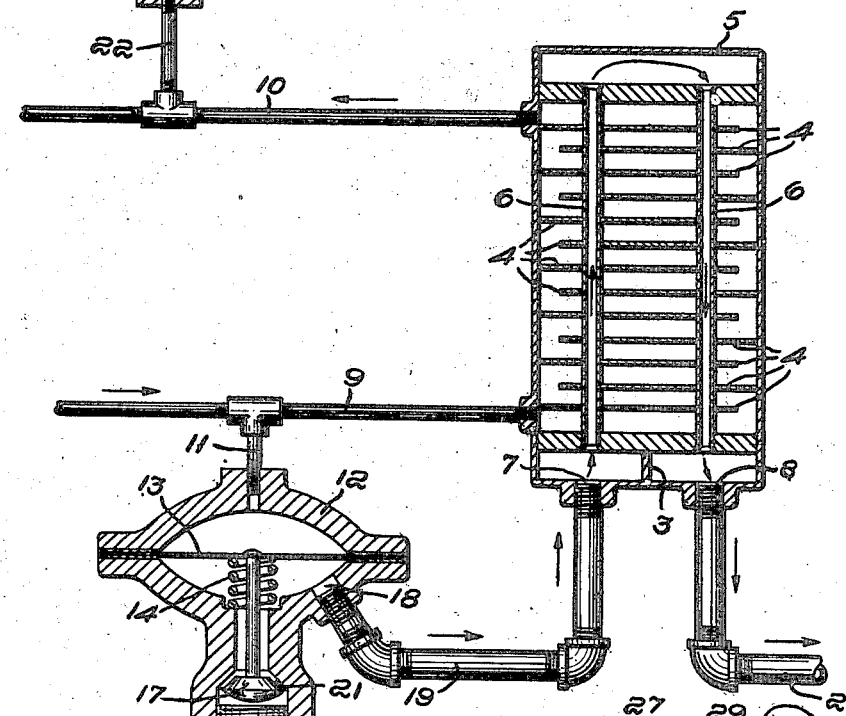
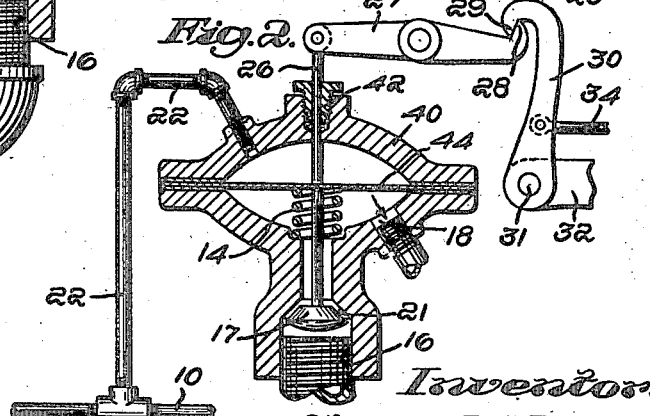

2,309,296

UNITED STATES PATENT OFFICE 2,309,296

OIL COOLER

Oliver D. H. Bentley, Norfolk, Mass.

Application March 27, 1941, Serial No. 385,510

1 Claim. (Cl. 184—104)

This invention relates to oil coolers and relates more particularly to controls for preventing water from entering the oil lines of an oil cooler through which water for the cooling of the oil is circulated.

On ships utilizing steam turbines, it is customary to cool the oil for lubricating the turbine and its associated mechanism in an oil cooler through which water from the ship flushing system is passed in indirect contact with the oil for cooling same. It is customary to maintain water pressures from say 50 to 75 pounds in the flushing systems. These pressures vary over a wide range depending upon the volume of water being used at any given time as for flushing the decks. The turbine characteristics are such that from 10 to 25 pounds lubricating oil pressure should be maintained. Heretofore due to electrolysis, chemicals in the harbor water, or erosion, leaks have developed in the water tubes in the oil coolers with the result the greater water pressure forced salt water into the oil causing lubrication failure and often as a consequence, serious damage to bearings, shafts and rotors of the turbines.

This invention eliminates the difficulties which have previously followed the failure of oil coolers by providing in association with the cooler, a pressure regulator which maintains the water pressure in the oil cooler, lower than that of the oil pressure so that in case of a leak developing in the water tubes, the oil flows into the water instead of the water into the oil, and by providing in association therewith, a pressure control for shutting down the turbine when the oil pressure as a result of an oil leak in the oil cooler, falls below a critical operating pressure.

An object of the invention is to prevent the indirect cooling fluid of an oil cooler from entering the oil in case a leak develops in the cooler.

Another object of the invention is to prevent bearings and equipment which rotates therein, from being damaged as a result of oil leaks in an oil cooler.

The invention will now be described with reference to the drawing of which:

Fig. 1 illustrates diagrammatically an oil cooler safety control system with elements thereof in section, embodying this invention, and Fig. 2 is a transverse section through a combined pressure reducing and shut-off valve which may be used to replace the corresponding separate valves of Fig. 1.

The oil cooler 5 is a cylindrical jacket which contains the water tubes 6 and has the inlet 7 and the outlet 8 for cooling water connections. The partition 3 separates the inlet 7 and outlet 8 and provides that the water flow the length of the cooler through one tube 6 illustrated and back again through the other tube 6 illustrated. The oil for lubricating the bearings of the associated turbine passes through the tube 9 into the cooler 5 and passes from the cooler through the tube 10; flows back and forth between the baffles 4 in contact with the outer surface of the tubes 6, to the bearings to be lubricated. The oil cooler illustrated is of well known construction and may contain a large number of water tubes.

The branch tube 11 carries oil from the tube 9 into the pressure regulating valve 12 which oil contacts the upper side (facing the drawing) of the diaphragm 13 and depresses same in accordance with the oil pressure. The depression of the diaphragm 13 is opposed by the bronze coiled spring 14 which is in contact with the underside of the diaphragm. Water from the flushing system is directed through the tube 15 into the water inlet 16 of the valve 12 and past the valve piston 17 in contact with the underside of the diaphragm 13 and thence through the outlet 18 and tube 19 into the inlet 7 of the oil cooler 5. Water from the oil cooler passes out through the open tube 20 for discharge into the sea.

The constants of the pressure regulating valve 12 are so proportioned that the piston 17 is adjusted relative to its seat 21, by the oil pressure acting upon the upper side of the diaphragm 13 so that the pressure of the water passing the piston 17 is maintained about, for example, a pound below the oil pressure. Then if for any reason a leak develops in a water tube 6 due to the pressure differential, oil flows into the tube 6 into the water in the cooler 5 instead of vice versa as has always occurred in the past with the result not only that the oil is not cut by the salt water with resulting bearing damage, but the pressure in the oil lines drops and actuates the additional safety control for shutting down the turbine which will now be described.

The branch tube 22 from the oil return tube 10, supplies oil into the valve 23 in contact with the underside (facing the drawing) of the diaphragm 24. The other side of the diaphragm is in contact with the spring 25 which opposes the oil pressure. The plunger 26 is connected to the upper side of the diaphragm and extends from the valve 23 and is attached to one end of the pivoted lever 27. The other end of the lever 27 has the lower extension 28 which normally extends as illustrated, in contact with the upper end 29 of the lever 30. The lever 30 is pivoted at 31 to the extension 32 from the steam valve 33. The piston rod 34 of the valve 33 is connected at its outer end to the lever 30 between its ends, and at its inner end to the valve piston 35. The spring 36 exerts pressure against the piston 35 tending to force it against its seat 37. The steam valve 33 has the steam inlet 38 for connection to the steam supply source, and has the steam outlet 39 for connection to the turbine or other mechanism to be controlled.

A leak in a water tube 6 in the cooler 5 will cause oil to enter the water and will cause the oil pressure in the tubes 10 and 22 and against the diaphragm 24 to drop, resulting in, when the pressure has fallen below a critical operating pressure, the spring 25 moving the diaphragm 24 to cause the rod 26 to move the lever 27 to remove the extension 28 from its holding contact with the upper end 29 of the lever 30. The spring 36 in the steam valve 33 then forces the piston 35 against its seat 37 to shut off the supply of steam to the turbine.

The valve 40 of Fig. 2 may be used in the system of Fig. 1 to combine the functions of the valves 12 and 23 of Fig. 1 in a single structure. The lower portion of the valve 40 below the diaphragm 41 is similar to that of the valve 12 previously described in that the water through the inlet 16 enters the valve and passes the piston to contact the lower surface of the diaphragm 44 before it passes from the valve through the outlet 18. Oil from the discharge tube 10 passes through the branch tubes 11 into the valve 40 in contact with the upper side of the diaphragm 44. The piston 26 which corresponds to the piston 26 of the valve 23 of Fig. 1 extends through the stuffing box 42 which prevents the escape of the oil around the piston 26. The lever 27 is similar to that of the lever 27 of Fig. 1 except that its extension 28 of Fig. 2 extends upwardly to engage the extension 29 of the lever 30, the extension of Fig. 2 being shaped to be engaged against the extension 28 when the oil pressure is normal.

When the oil pressure falls below the critical operating pressure, the diaphragm 44 moves upwardly (facing Fig. 2 of the drawing) so that the piston 26 moves the lever 27 to cause the extension 28 to become disengaged from the extension 29 of the lever 30 to cause as in the case of the valve 23 the stem to be shut off by the associated valve 33.

Prior to such time as the oil pressure falls below the critical point, the oil pressure on the upper side of the diaphragm 40 moves the diaphragm to cause the piston 17 to maintain a lower water pressure to the oil cooler, as previously described in connection with the valve 12 of Fig. 1. Oil pressure variations above the said critical operating pressure would not be sufficient to disengage the extension 28 of the lever 27 from the extension 29 of the lever 30, to shut off the steam supply to the turbine.

It is seen that the water pressure control mechanism and the steam control mechanism cooperate in that the water pressure control mechanism permits the oil to leak outwardly in case a leak develops in a water tube in the cooler instead of the water being forced into the oil as in the past, and in that the leaking of the oil causes the oil pressure to drop to actuate the steam control mechanism.

While the invention has been described in connection with oil coolers for steam turbines, using water for the cooling of the oil, other fluids may be used in association with other mechanisms.

While embodiments of the invention have been described for the purpose of illustration, it should be understood that the invention is not limited to the exact apparatus and arrangement of apparatus illustrated, as modifications thereof may be suggested by those skilled in the art without departure from the essence of the invention.

What is claimed is:

A pressure control valve for a liquid cooler, comprising a diaphragm; means forming a passage for conducting a liquid to be cooled in contact with one side of said diaphragm; means forming an inlet and an outlet passage for conducting a cooling liquid into said valve, in contact with the other side of said diaphragm, and from said valve; a piston attached to said diaphragm; means in said inlet passage forming a seat for said piston; a spring for biasing said piston towards contact with said seat; a shut-off valve for closing off the supply of actuating fluid for a machine, and means including means connected to said diaphragm for closing said shut-off valve when the pressure of the liquid to be cooled against said one side of said diaphragm falls below normal.

OLIVER D. H. BENTLEY.